United States Patent
Cropper et al.

(10) Patent No.: US 10,956,526 B2
(45) Date of Patent: Mar. 23, 2021

(54) IMPLEMENTING A POLICY-DRIVEN RESOURCE DEPLOYMENT MECHANISM IN A CLOUD ENVIRONMENT

(71) Applicant: International Business Machines Corporation, Armonk, NY (US)

(72) Inventors: Joseph W. Cropper, Austin, TX (US); Jeffrey W. Tenner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 16/291,394

(22) Filed: Mar. 4, 2019

(65) Prior Publication Data
US 2020/0285496 A1 Sep. 10, 2020

(51) Int. Cl.
*G06F 9/455* (2018.01)
*G06F 16/9535* (2019.01)
*G06F 9/50* (2006.01)
*G06F 9/445* (2018.01)
*G06F 16/00* (2019.01)
*G06N 5/02* (2006.01)
*G06Q 10/06* (2012.01)

(52) U.S. Cl.
CPC ...... *G06F 16/9535* (2019.01); *G06F 9/44505* (2013.01); *G06F 9/45541* (2013.01); *G06F 9/45558* (2013.01); *G06F 9/5005* (2013.01); *G06F 16/00* (2019.01); *G06F 2009/45583* (2013.01); *G06F 2009/45595* (2013.01); *G06N 5/022* (2013.01); *G06N 5/025* (2013.01); *G06Q 10/0631* (2013.01)

(58) Field of Classification Search
CPC .......... G06F 8/60; G06F 8/38; G06F 9/45533; G06F 21/126; G06F 9/44505; G06F 40/30; G06F 16/00; G06F 16/9535; G06Q 30/0206; G06Q 10/06; G06Q 10/0631; G06Q 30/0625; H04L 67/1004; G06N 5/022
See application file for complete search history.

(56) References Cited

U.S. PATENT DOCUMENTS

| | | | |
|---|---|---|---|
| 9,052,961 B2 | 6/2015 | Mangtani et al. | |
| 9,448,826 B2 | 9/2016 | Banerjee | |
| 9,521,151 B2 | 12/2016 | Kinsella et al. | |
| 9,639,390 B2 | 5/2017 | Cropper et al. | |
| 9,864,618 B2 | 1/2018 | Cropper et al. | |
| 9,985,827 B2 | 5/2018 | Li | |
| 2010/0153443 A1* | 6/2010 | Gaffga | G06Q 10/06 707/770 |

(Continued)

*Primary Examiner* — Tuan A Vu
(74) *Attorney, Agent, or Firm* — Daniel M. Yeates

(57) ABSTRACT

A method and system are provided for implementing a policy-driven resource deployment in a cloud environment. A rules-based workflow is used to determine an enhanced deployment option based on requirements of an end user. A policy-driven catalog entry is created including a corresponding set of questions to determine how the end user intends to use their environment. The end user makes a request which contains answers to the set of questions. Answers contained in the end user request are applied to a set of rules for determining a particular deployment option, and resources are deployed using the determined deployment option.

20 Claims, 5 Drawing Sheets

(56) References Cited

U.S. PATENT DOCUMENTS

| | | | |
|---|---|---|---|
| 2011/0145789 A1* | 6/2011 | Rasch | G06F 9/44505 |
| | | | 717/121 |
| 2013/0067449 A1* | 3/2013 | Sannidhanam | G06F 8/60 |
| | | | 717/170 |
| 2013/0167147 A1* | 6/2013 | Corrie | G06F 9/45533 |
| | | | 718/1 |
| 2013/0204746 A1* | 8/2013 | Lee | G06Q 30/0625 |
| | | | 705/26.62 |
| 2014/0074905 A1 | 3/2014 | Schincariol et al. | |
| 2014/0278808 A1* | 9/2014 | Iyoob | G06Q 30/0206 |
| | | | 705/7.35 |
| 2017/0323089 A1* | 11/2017 | Duggal | G06F 21/126 |
| 2018/0024537 A1* | 1/2018 | Chauvet | H04L 67/1004 |
| | | | 718/104 |
| 2018/0039486 A1* | 2/2018 | Kulkarni | G06F 8/38 |
| 2019/0042988 A1* | 2/2019 | Brown | G06Q 10/0631 |
| 2020/0021488 A1* | 1/2020 | Joshi | G06F 40/30 |

* cited by examiner

IMPLEMENTING A POLICY-DRIVEN RESOURCE DEPLOYMENT MECHANISM IN A CLOUD ENVIRONMENT

FIELD OF THE INVENTION

The present invention relates generally to the data processing field, and more particularly, relates to a method and system for implementing a policy-driven resource deployment mechanism in a cloud environment.

DESCRIPTION OF THE RELATED ART

Cloud computing enables distributed computing over a network in a cloud environment. Cloud computing includes a model of service delivery generally enabling convenient, on-demand network access to a shared pool of configurable computing resources, for example, networks, network bandwidth, servers, processing, memory, storage, applications, virtual machines, and services that can be rapidly provisioned and released with minimal management effort or interaction with a provider of the service.

Currently building entries for a self-service application catalog used for resource deployment in a cloud environment is difficult to achieve effective resource deployment for the end users. Currently cloud system administrators struggle to determine particular technologies to use for the respective catalog entries. The resource deployment enabled by currently defined catalog entries often results in a technology selection that is not the best for an end user's ultimate goal.

SUMMARY OF THE INVENTION

Principal aspects of the present invention are to provide a method and system for implementing a policy-driven resource deployment mechanism in a cloud environment. Other important aspects of the present invention are to provide such method and system substantially without negative effects and that overcome many of the disadvantages of prior art arrangements.

In brief, a method and system are provided for implementing policy-driven resource deployment in a cloud environment. A rules-based workflow is used to determine an enhanced deployment option based on requirements of an end user. A policy-driven catalog entry is created including a corresponding set of questions to determine how the end user intends to use their environment. The end user makes a request which contains answers to the set of questions. Answers contained in the end user request are applied to a set of rules for determining a particular deployment option, and resources are deployed using the determined deployment option.

In accordance with features of the invention, one or more coding graph-based workflows are used to decide on a deployment topology, for example, including bare metal server, virtual machine (VM) or container and on platform, for example, x86 32-bit machine, 64-bit Linus® on Power® (ppc641e), Power8®, or 64-bit machine, and/or an IBM® Z mainframe. The policy-driven catalog entry defines an appropriate subset of options, because not every catalog entry will support all deployment options.

In accordance with features of the invention, the policy-driven catalog entry defines, for example, at least one of VM images to be used; at least one of container images to be used; and/or at least one of bare metal provisioning infrastructure, including boot media, to be used.

In accordance with features of the invention, after loading a candidate set of resources, such as containers, virtual machines (VMs) and bare metal, then a rules-based workflow is defined to guide the decision-making process.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention. For example, references to "file" should be broadly considered to include and may be substituted with block, page or any other logical subdivision of data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing a policy-driven resource deployment in a cloud environment. A rules-based workflow is used to determine an enhanced deployment option based on requirements of an end user.

It should be understood that embodiments of the present invention are not limited to a cloud computing environment. Embodiments of the present invention can be implemented in conjunction with other types of computing environments now known or later developed.

Cloud Service Models are as follows: Software as a Service (SaaS): the capability provided to the consumer is to use the provider's applications running on a cloud infrastructure. The applications are accessible from various client devices through a thin client interface such as a web browser (e.g., web-based email). Platform as a Service (PaaS): the capability provided to the consumer is to deploy onto the cloud infrastructure consumer-created or acquired applications created using programming languages and tools supported by the provider. Infrastructure as a Service (IaaS): the capability provided to the consumer is to provision processing, storage, networks, and other fundamental computing resources where the consumer is able to deploy and run arbitrary software, which can include operating systems and applications.

Figure 1:
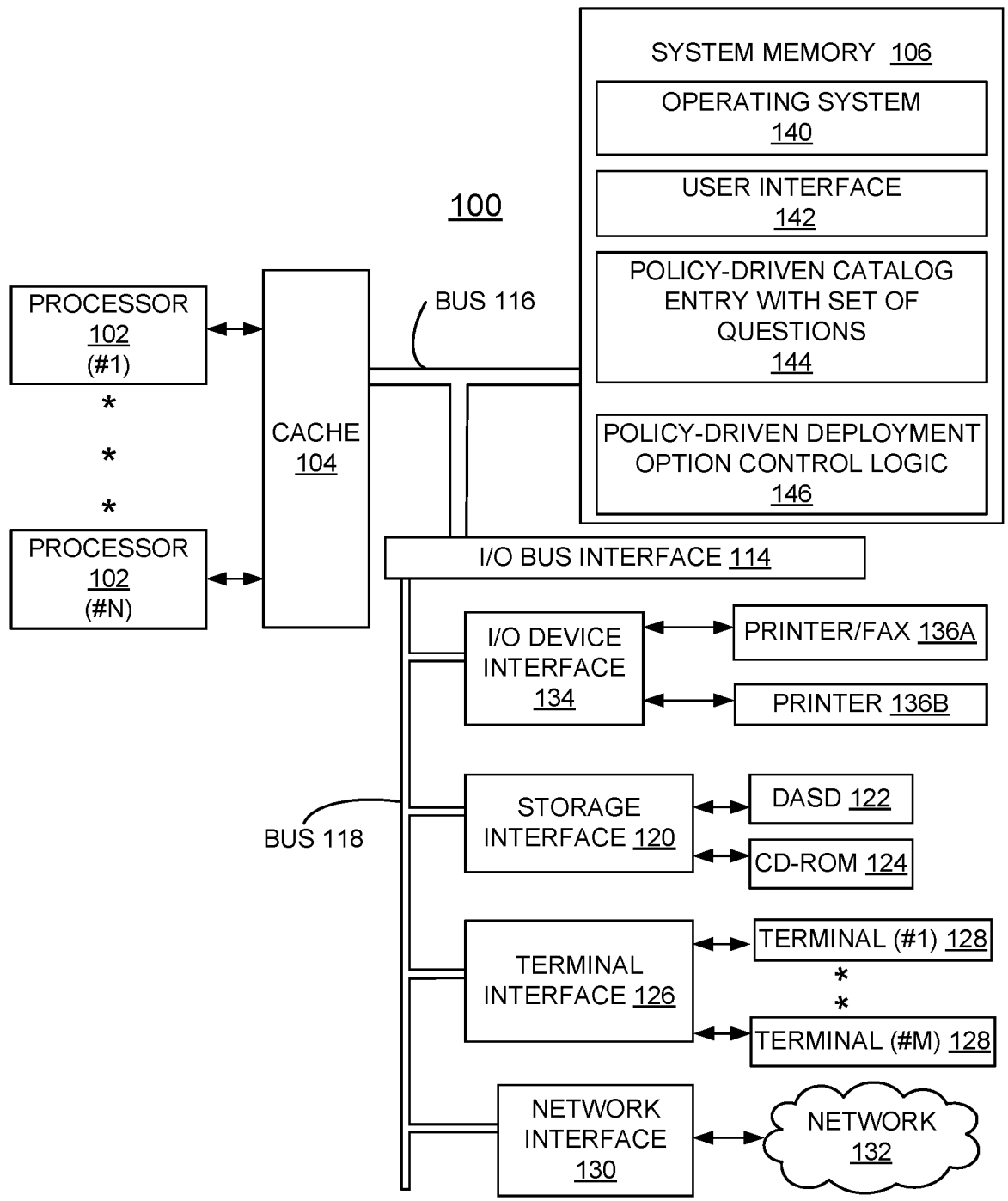
FIG. 1 is a block diagram of an example computer system for implementing a policy-driven resource deployment mechanism in a cloud environment in accordance with an embodiment of the invention.

Having reference now to the drawings, in FIG. 1, there is shown an example computer system embodying the present invention generally designated by the reference character 100 for implementing policy-driven resource deployment methods in a cloud environment in accordance with an embodiment of the invention. Computer system 100 provides an example of a cloud computing node in the cloud environment. Computer system 100 is suitable for use with, for example, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including applications and programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores an operating system 140, a user interface 142, a self-service application including a catalog policy-driven catalog entry with a set of questions 144 in accordance with the preferred embodiments, and a policy-driven deployment option control logic 146 in accordance with the preferred embodiments.

In accordance with features of embodiments of the invention, one or more coding graph-based workflows are used by policy-driven deployment option control logic 146 to decide on a deployment topology, for example, including a bare metal server, virtual machine or container and on which platform or provisioning infrastructure, for example, 32-bit machine, x86 or such as Linus® on Power® (ppc641e), Power8®, or 64-bit machine, or a mainframe computer, such as IBM Z family of mainframe computers. The policy-driven catalog entry 144 defines an appropriate subset of options, since not every catalog entry will support all deployment options.

In accordance with features of embodiments of the invention, the policy-driven catalog entry 144 defines, for example, VM images to be used; container images to be used; and/or bare metal provisioning infrastructure, including boot media, that could be used.

In accordance with features of embodiments of the invention, after loading a candidate set of resources, such as containers, virtual machines (VMs), and bare metal server, then a rules-based workflow is defined to guide the decision-making process.

Figure 2:
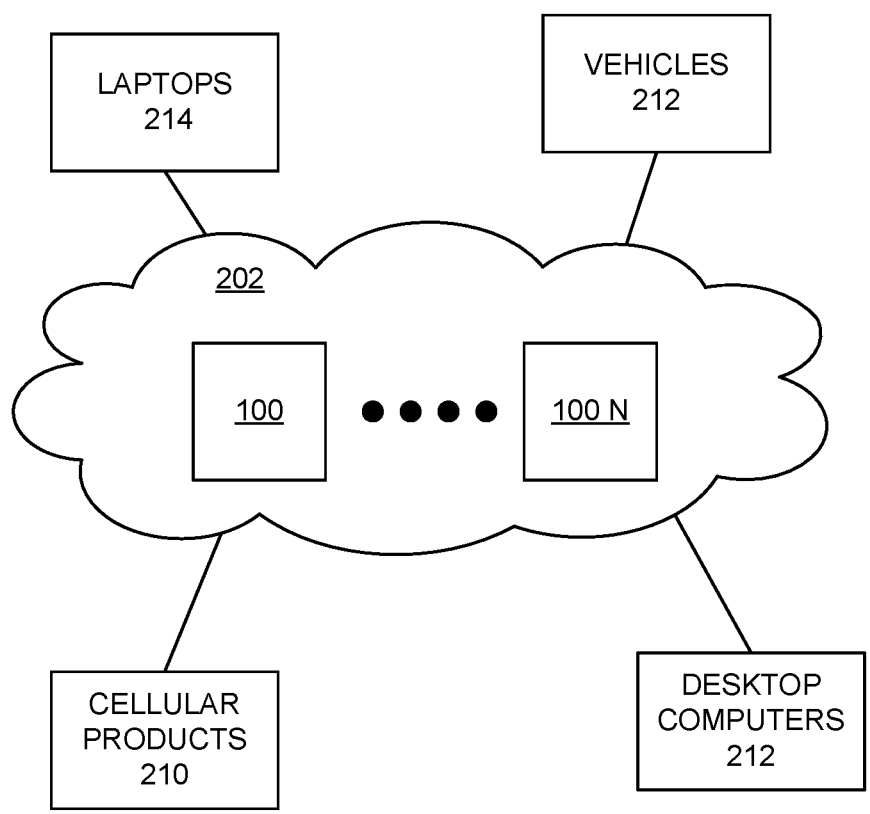
FIG. 2 is a block diagram of an example cloud computing environment in accordance with an embodiment of the invention.

Referring now to FIG. 2, there is shown an example cloud computing environment generally designated by the respective reference character 200 in accordance with the preferred embodiment. As shown, cloud computing environment 200 including a network 202 comprises one or more cloud computing nodes or computer systems 100 with network 202 including local computing devices used by cloud consumers, such as, for example, personal digital assistants (PDAs) and cellular telephones 210, desktop computers 212, laptop computer 214, and vehicles or automobile computer systems 216 may communicate. Nodes or computer systems 100 may communicate with one another. Nodes or computer systems 100 may be grouped (not shown) physically or virtually, in one or more networks, such as Private, Community, Public, or Hybrid clouds, or a combination thereof. Computing environment 200 can offer infrastructure, platforms and/or software as services for which a cloud consumer does not need to maintain resources on a local computing device. It is understood that the types of computing devices 210, 212, 214, 216 and computer systems 100 shown in FIG. 2 are intended to be illustrative only and that computer system nodes 100 and cloud computing environment 200 can communicate with any type of computerized device over any type of network and/or network addressable connection, for example, using a web browser.

Figure 3:
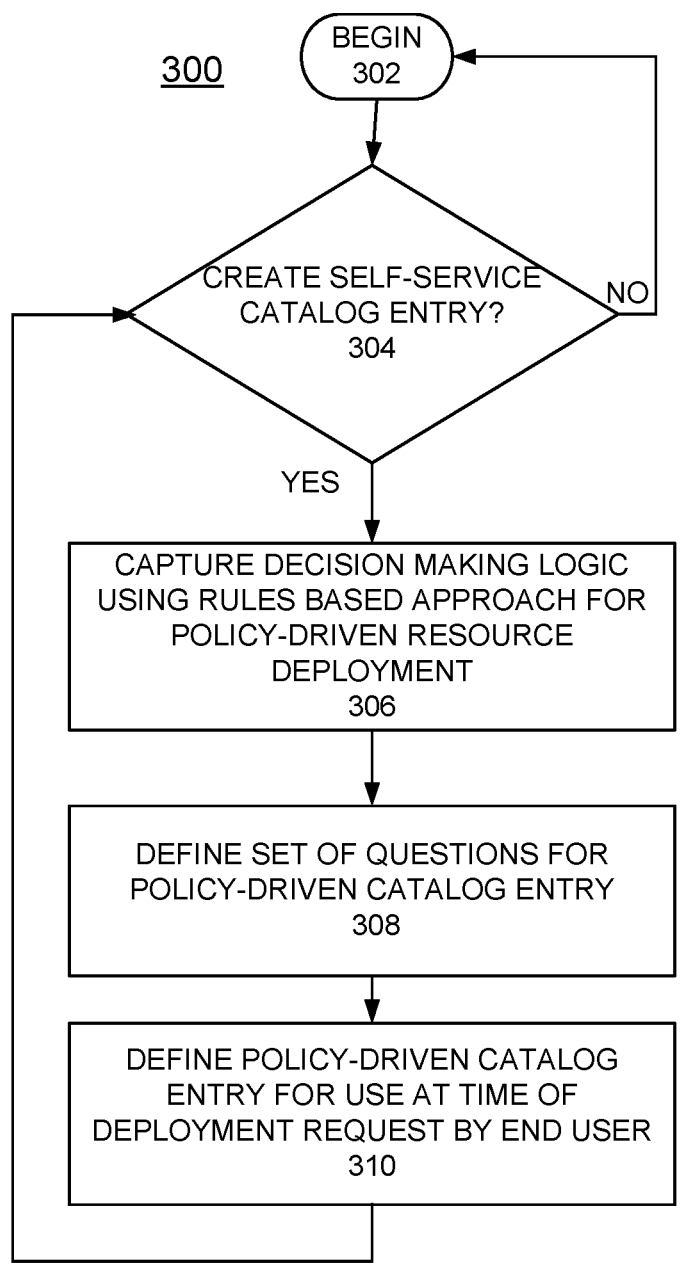
FIGS. 3 and 4 are respective flow charts illustrating example operations for implementing a policy-driven resource deployment mechanism in a cloud environment in accordance with embodiments of the invention.
Figure 4:
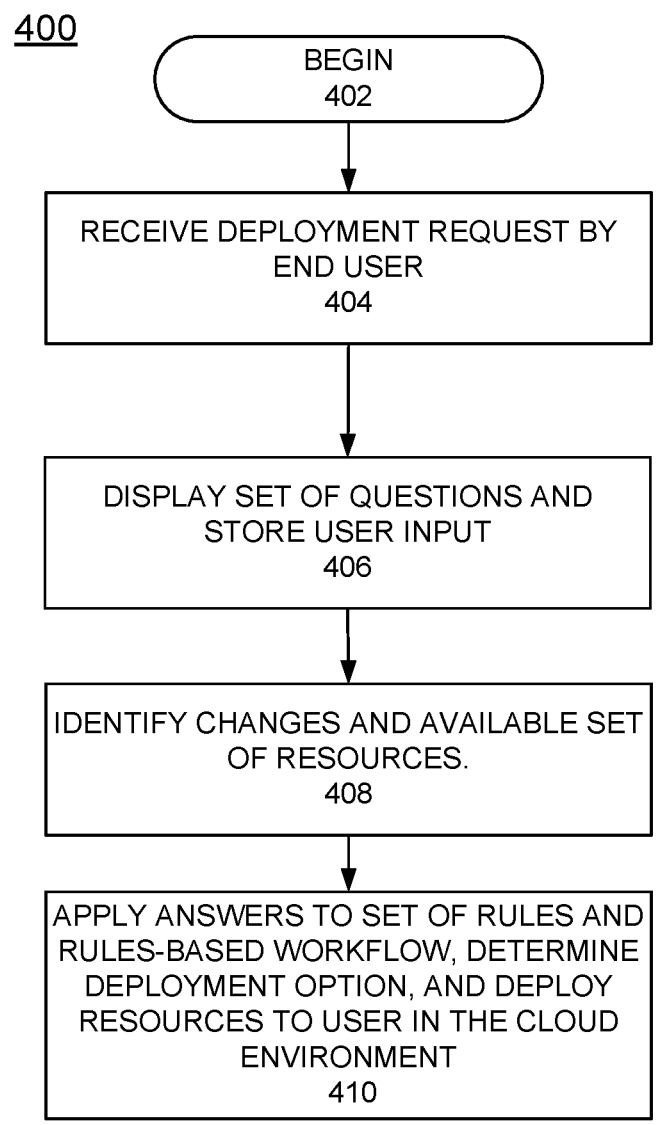

Referring now to FIGS. 3 and 4, there is shown example flow charts illustrating example operations generally designated by the respective reference characters 300, 400 for implementing a policy-driven resource deployment mechanism in a cloud environment in accordance with the preferred embodiment.

Operations to create a self-service catalog entry begin at a block 302 in FIG. 3. Checking for a request to create a self-service catalog entry is performed as indicated at a decision block 304. For policy-driven deployment option control logic, decision making logic using a rules-based approach is captured for policy-driven resource deployment as indicated at a block 306. A policy-driven catalog entry is created with a corresponding set of questions defined to determine how the end user intends to use their cloud environment as indicated at a block 308. The policy-driven catalog entry is defined for use at time of a resource deployment request by an end user as indicated at a block 310.

In accordance with features of embodiments of the invention, a policy-driven catalog entry is created, and an appropriate subset of deployment resources is defined, for example, as follows: (1) Which VM images to be used, for example, could be pointers to images in an existing IaaS layer, such as, VMware, AWS, Azure, PowerVC, and the like. (2) Which container images to be used, for example, could be pointers to an existing Docker registry, such as Docker Hub. (3) Which bare metal provisioning infrastructure, including boot media, could be used, for example, OpenStack Ironic, xCAT, and the like.

In accordance with features of embodiments of the invention, after a candidate set of resources are loaded such as, containers, VMs, and bare metal, then a rules-based workflow is defined to guide the decision-making process for a policy-driven catalog entry called Ubuntu. For example, consider this workflow engine set of questions: (1) Will your instance of Ubuntu be used to run many applications? Yes/No; (2) Do you need persistent storage for your Ubuntu deployment? Yes/No; and (3) Would your instance of Ubuntu benefit from accelerated GPU hardware? Yes/No. Example defined outcomes of the rules engine include:
No→No→No→Deploy container on x86;
No→No→Yes→Deploy container on ppc641e;
Yes→*(any)→*(any)→Deploy on bare metal server;
No→Yes→No→Deploy on x86 virtual machine.
This provides maximum flexibility in terms of the resources that can be used for today's diverse set of workloads.

In accordance with features of embodiments of the invention, the rules engine could also consider in its decision additional metadata attached to each resource, such as each container, VM, bare metal image. For example, considering whether this resource benefit from certain hardware, such as GPUs, FPGAs, and the like, whether this application is data intensive, and the like. This metadata could also be used in to the overall decision about which resource to ultimately deploy.

Operations for implementing enhanced policy-driven resource deployment in a cloud environment using a self-service catalog entry begin at a block 402 in FIG. 4. A deployment request is received from an end user as indicated at a block 404. A set of questions is displayed, and the end user provides answers to the set of questions, that are stored as indicated at a block 406. Changes and an available set of resources are identified as indicated at a block 408.

Answers contained in the end user request are applied to a set of rules for determining a particular deployment option, and resources are deployed using the determined deployment option as indicated at a block 410. Rules-based workflow is used to determine an enhanced deployment option based on requirements of an end user and resources are deployed using the determined deployment option as indicated at the block 410.

In accordance with features of embodiments of the invention, the catalog can be tied into changes to the resource, for example, the resource initially was to run a single application, but now needs to run multiple applications, and to invoke a registered backup service for the image, create a new resource instance, invoke a registered restore service for the image to move the state from the original image, and de-provision the original image.

In accordance with features of embodiments of the invention, the rules engine could also be adaptive in that at certain points in time, for example, under limited resource availability, the rules engine could provision a leaner container rather than a virtual machine so that it can more densely pack workloads and this adaptive mode would be applied only if permitted by the catalog administrator.

Figure 5:
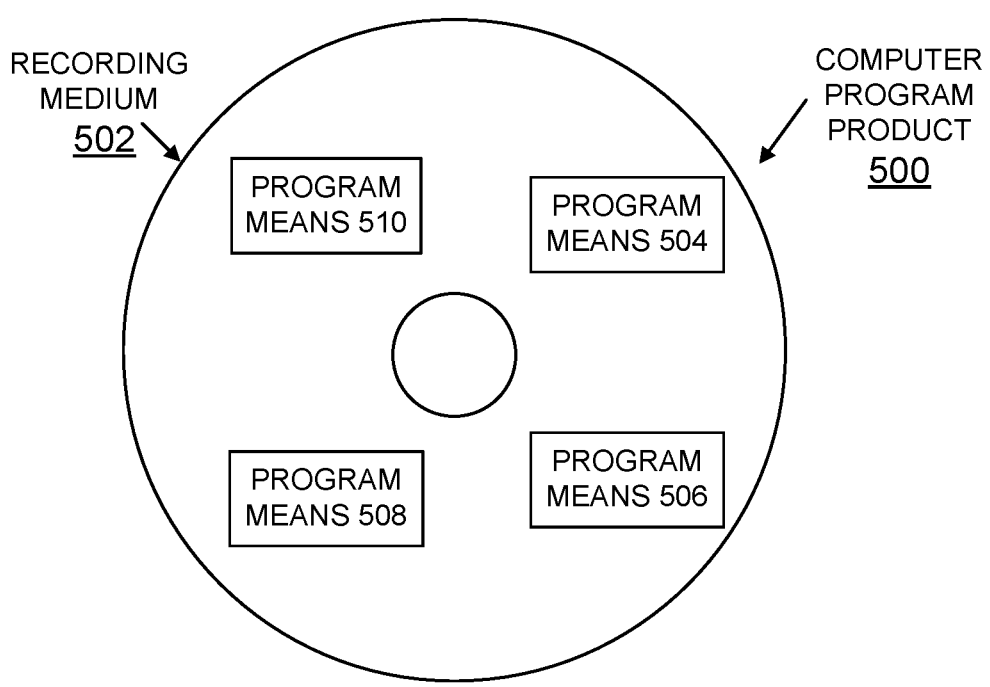
FIG. 5 is a block diagram illustrating a computer program product in accordance with an embodiment of the invention.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. The computer readable storage medium 502, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 502 stores program means or instructions 504, 506, 508, and 510 on the non-transitory computer readable storage medium 502 for carrying out the methods for implementing enhanced policy-driven resource deployment in a cloud environment in the systems 100, 200 of FIGS. 1 and 2.

Computer readable program instructions 504, 506, 508, and 510 described herein can be downloaded to respective computing/processing devices from a computer readable storage medium or to an external computer or external storage device via a network, for example, the Internet, a local area network, a wide area network and/or a wireless network. The computer program product 500 may include cloud based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 504, 506, 508, and 510 from the network and forwards the computer readable program instructions for storage in a computer readable storage medium within the respective computing/processing device.

A sequence of program instructions or a logical assembly of one or more interrelated modules defined by the recorded program means 504, 506, 508, and 510, direct the system 100 for implementing enhanced policy-driven resource deployment in a cloud environment of preferred embodiments.

While the present invention has been described with reference to the details of the embodiments of the invention shown in the drawing, these details are not intended to limit the scope of the invention as claimed in the appended claims.

What is claimed is:

1. A computer-implemented method for implementing a policy-driven resource deployment mechanism in a cloud environment, said computer-implemented method comprising:

creating a plurality of policy-driven catalog entries for resource deployment in the cloud environment, wherein each catalog entry defines a virtual machine image, a container image, and bare metal infrastructure to deploy, wherein each entry includes a corresponding set of questions configured to determine how an end user intends to use the cloud environment, and wherein each policy-driven catalog entry is created by a system administrator;

receiving, from the end user, an end user request for a resource deployment based on a first catalog entry of the plurality of catalog entries, the request containing answers to the set of questions; and applying the answers contained in the end user request to a set of rules;

determining, based on the applying, a particular deployment option, wherein the particular deployment is based on the requirement of the end user, the received end user answers and is changed from the catalog entry definition; and deploying resources using the determined particular deployment option.

2. The method as recited in claim 1, including using a rules-based workflow to determine an enhanced deployment option based on requirements of the end user.

3. The method as recited in claim 1, including using a coding graph-based workflow for determining topology of the deployment option.

4. The method as recited in claim 1, wherein determining the deployment option includes identifying a deployment topology including at least one of virtual machine (VM) and container.

5. The method as recited in claim 1, wherein determining the deployment option includes identifying a deployment topology including at least one platform.

6. The method as recited in claim 1, wherein determining the deployment option includes identifying a deployment topology having a selected platform including at least one of a 32-bit machine and a 64-bit machine.

7. The method as recited in claim 1, wherein determining the deployment option includes identifying a deployment topology having a selected platform including a mainframe computer.

8. The method as recited in claim 1, wherein determining the deployment option includes identifying available resources.

9. The method as recited in claim 1, wherein determining the deployment option includes identifying a candidate set of resources.

10. The method as recited in claim 9, wherein identifying the candidate set of resources includes identifying and using metadata associated with at least one of the resources to determine the deployment option.

11. A system for implementing a policy-driven resource deployment mechanism in a cloud environment, comprising:
    a processor;
    a policy-driven deployment option control logic tangibly embodied in a non-transitory machine readable medium;
    said processor using said policy-driven deployment option control logic to perform:
    creating a plurality of policy-driven catalog entries, wherein each catalog entry defines a virtual machine image, a container image, and bare metal infrastructure to deploy, wherein each entry includes a corresponding set of questions for each entry configured to determine how an end user intends to use the cloud environment, and wherein each policy-driven catalog entry is created by a system administrator;

receiving, from the end user, an end user request for a resource deployment based on a first catalog entry, the request containing answers to the set of questions;

applying the answers contained in the end user request to a set of rules;

determining, based on the applying, a particular deployment option, wherein the particular deployment is based on the requirement of the end user, the received end user answers and is changed from the catalog entry definition; and deploying resources using the determined particular deployment option.

12. The system as recited in claim 11, further including said processor using said policy-driven deployment option control logic using a rules-based workflow to determine an enhanced deployment option based on requirements of the end user.

13. The system as recited in claim 12, further including said processor using said policy-driven deployment option control logic using a coding graph-based workflow to decide on a topology of the enhanced deployment option.

14. The system as recited in claim 11, wherein creating a policy-driven catalog entry including a corresponding set of questions to determine how the end user intends to use the cloud environment includes a system administrator creating the policy-driven catalog entry.

15. The system as recited in claim 11, wherein creating a policy-driven catalog entry including a corresponding set of questions to determine how the end user intends to use the cloud environment includes loading a set of available resources.

16. The system as recited in claim 11, wherein determining the deployment option includes identifying a candidate set of resources.

17. The system as recited in claim 16, wherein identifying the candidate set of resources includes identifying and using metadata associated with at least one of the resources to determine the deployment option.

18. The system as recited in claim 11, wherein determining the deployment option includes identifying a deployment topology having one or more of a bare metal server, a container and a virtual machine (VM).

19. The system as recited in claim 18, including identifying a deployment topology having a selected platform including at least one of 32-bit and 64-bit machine.

20. The system as recited in claim 18, including identifying a deployment topology having a selected platform including a mainframe computer.

* * * * *